(No Model.)
C. B. BRAINARD.
BARBED WIRE.
No. 298,440. Patented May 13, 1884.
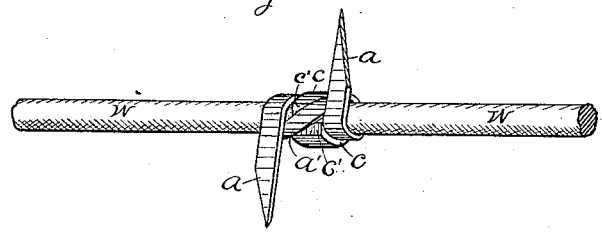
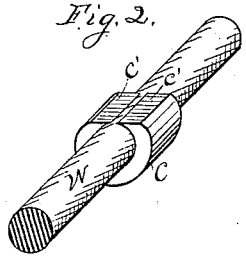 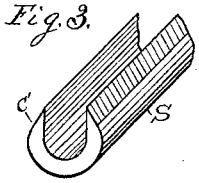
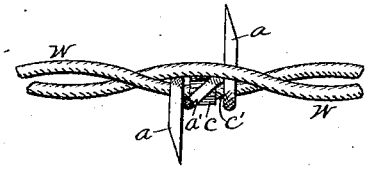
Witnesses.
Thos H Hutchins.
Wm J Hutchins.
Inventor.
Curtis B. Brainard.

UNITED STATES PATENT OFFICE.

CURTIS B. BRAINARD, OF JOLIET, ILLINOIS.

BARBED WIRE.

SPECIFICATION forming part of Letters Patent No. 298,440, dated May 13, 1884.

Application filed January 11, 1884. (No model.)

*To all whom it may concern:*

Be it known that I, CURTIS B. BRAINARD, a citizen of the United States of America, residing at Joliet, in the county of Will and State of Illinois, have invented certain new and useful Improvements in Barbed Wires for Fences, of which the following is a specification, reference being had therein to the accompanying drawings.

Figure 1 is a perspective view of the barb and collar applied to a single-strand wire; Fig. 2, a perspective view of a section of a single-strand wire having the collar $c$ applied to it; Fig. 3, a perspective view of a section of the material from which the collar $c$ is made, and Fig. 4 a side view of the barb and collar applied to a single-strand wire and a second strand-wire twisted therewith.

This invention relates to certain improvements in barbed wires for fences, which improvements I will describe in the following specification and claim.

Referring to the drawings, $w$, Fig. 1, represents a single-strand wire of the fence, on which collars $c$ are placed at suitable intervals for the barbs $a$ to be placed on, as shown in Figs. 1 and 3. These collars may be formed from a U-shaped piece or strip of metal cut up in sections of suitable length, and applied to the wire by compression or otherwise, or may be integral with the wire, as may be desired. The outer corners of the collar are chamfered off, as shown in Figs. 1, 2, and 3 at $c'$, so that after the collar is applied to the strand-wire its two edges will barely meet around the wire and leave a flattened surface, as shown in Figs. 1 and 2, for the central part or body of the barb to lie on or across, as shown in Figs. 1 and 4. The barb $a$ is coiled on the strand-wire, as shown in said figures, so that its body or central part lies diagonally across said flattened seat next to the strand-wire, and then each prod is coiled back upon the strand-wire next to the collar $c$ in opposite directions, as shown in said figures, forming a very neat, compact, and effective two-point barb.

The barbs $a$ may be made of any kind or shape of metal that can be used, as described. The flattened or depressed part of the collar $c$ prevents any rotation of the barb on the strand-wire, and the collar prevents any lateral motion of the barb along on the strand-wire. When it is desired, a fellow strand-wire may be twisted with the wire upon which the collar is placed, as shown in Fig. 4, to form a double-strand cable.

Having thus described my invention, what I claim as new, and desire to secure by Letters Patent, is as follows, to wit:

The combination of the strand-wire $w$, collar $c$, having the flattened side $c'$, and barb $a$, having its central portion or body lie diagonally across said flattened portion of said collar, and having its prods coiled in opposite directions on said strand-wire, one on either side of said collar, as and for the purpose set forth.

CURTIS B. BRAINARD.

Witnesses:
THOS. H. HUTCHINS,
W. J. HUTCHINS.